(12) United States Patent
Carbaugh (10) Patent No.: US 12,296,804 B2
(45) Date of Patent: May 13, 2025

(54) AUTONOMOUS EMERGENCY BRAKING APPARATUS FOR A VEHICLE

(71) Applicant: Bendix Commercial Vehicle Systems LLC, Avon, OH (US)

(72) Inventor: Jeffrey M. Carbaugh, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 70 days.

(21) Appl. No.: 18/347,881

(22) Filed: Jul. 6, 2023

(65) Prior Publication Data

US 2025/0010821 A1 Jan. 9, 2025

(51) Int. Cl.
 *B60T 7/22* (2006.01)
 *B60T 8/58* (2006.01)
 *B60W 10/06* (2006.01)
 *B60W 10/18* (2012.01)
 *B60W 30/08* (2012.01)

(52) U.S. Cl.
 CPC ........... *B60T 7/22* (2013.01); *B60T 8/58* (2013.01); *B60W 10/06* (2013.01); *B60W 10/18* (2013.01); *B60W 30/08* (2013.01); *B60T 2201/024* (2013.01); *B60T 2210/32* (2013.01); *B60T 2250/04* (2013.01); *B60W 2520/10* (2013.01); *B60W 2554/4042* (2020.02); *B60W 2710/0605* (2013.01); *B60W 2710/0677* (2013.01); *B60W 2710/18* (2013.01)

(58) Field of Classification Search
 CPC .......... B60T 7/22; B60T 2201/022; B60T 2201/024; B60T 8/58; B60W 10/06; B60W 10/18; B60W 30/08; B60W 2554/4042
 See application file for complete search history.

(56) References Cited

U.S. PATENT DOCUMENTS 6,084,508 A 7/2000 Mai
10,486,592 B2 11/2019 Toyota
(Continued)

FOREIGN PATENT DOCUMENTS

DE 102017007282 A1 4/2018
JP 2015205641 A 11/2015

OTHER PUBLICATIONS

Bendix Commercial Vehicle Systems LLC, "Bendix(r) Fusion(tm)," advertisement, Mar. 2021, 9 pages, Bendix Commercial Vehicle Systems LLC, Avon Ohio U.S.A.

(Continued)

*Primary Examiner* — Gonzalo Laguarda
(74) *Attorney, Agent, or Firm* — Cheryl L. Greenly; Brian E. Kondas; Geoffrey A. Kudlo (57) ABSTRACT

An autonomous emergency braking apparatus is provided for a host vehicle having one or more sensors providing one or more sensor signals indicative of status of at least one vehicle adjacent to the host vehicle. The autonomous emergency braking apparatus comprises a vehicle controller arranged to (i) monitor the one or more sensor signals indicative of the status of the at least one vehicle adjacent to the host vehicle, and (ii) provide at least one control signal for controlling extent of deceleration of the host vehicle based upon the status of the at least one vehicle adjacent to the host vehicle in the event of the host vehicle colliding with a vehicle in front of the host vehicle.

19 Claims, 3 Drawing Sheets

(56) References Cited

U.S. PATENT DOCUMENTS

| | | | |
|---|---|---|---|
| 11,364,883 B2* | 6/2022 | Costin | B60T 8/172 |
| 2014/0025270 A1* | 1/2014 | Kosanam | B60T 8/17554 |
| | | | 701/70 |
| 2018/0208192 A1 | 7/2018 | Olsson | |

OTHER PUBLICATIONS

European Patent Office, European Search Report, Report, Dec. 23, 2024, 12 pages, European Patent Office, Munich Germany.

* cited by examiner

AUTONOMOUS EMERGENCY BRAKING APPARATUS FOR A VEHICLE

BACKGROUND

The present application relates to vehicle emergency braking systems, and is particularly directed to an autonomous emergency braking apparatus for a vehicle such as a commercial vehicle (e.g., a truck).

Vehicle emergency braking systems for trucks are known. One type of vehicle emergency braking system for trucks is an autonomous emergency braking system in which brakes are applied in response to detection of a truck collision.

Collision mitigation systems for lessening severity of a collision or potential collision with a forward vehicle are also known. In a known collision mitigation system, the brakes can be continuously applied if needed.

Despite advancements already made, those skilled in the art continue with research and development efforts in the field of vehicle emergency braking systems and collision mitigation systems, such as those used in trucks.

SUMMARY

In accordance with one embodiment, an autonomous emergency braking apparatus is provided for a host vehicle having one or more sensors providing one or more sensor signals indicative of status of at least one vehicle adjacent to the host vehicle. The autonomous emergency braking apparatus comprises a vehicle controller arranged to (i) monitor the one or more sensor signals indicative of the status of the at least one vehicle adjacent to the host vehicle, and (ii) provide at least one control signal for controlling extent of deceleration of the host vehicle based upon the status of the at least one vehicle adjacent to the host vehicle in the event of the host vehicle colliding with a vehicle in front of the host vehicle.

In accordance with another embodiment, an autonomous emergency braking apparatus is provided for a host vehicle. The autonomous emergency braking apparatus comprises at least one sensor mounted on the host vehicle and arranged to detect a potential or actual collision of the host vehicle with a vehicle in front of the host vehicle and to provide a collision signal indicative thereof. The apparatus also comprises a first traffic sensor mounted on the host vehicle and arranged to detect velocity of a first moving vehicle adjacent to the host vehicle and to provide a first velocity signal indicative thereof. The apparatus further comprises control means for, when the collision signal is provided, controllably decelerating the host vehicle based upon the first velocity signal.

In accordance with still another embodiment, an autonomous emergency braking apparatus is provided for a host vehicle. The autonomous emergency braking apparatus comprises at least one sensor mounted on the host vehicle and arranged to detect a potential or actual collision of the host vehicle with a vehicle in front of the host vehicle and to provide a collision signal indicative thereof. The autonomous emergency braking apparatus also comprises a vehicle controller arranged to (i) monitor the at least one sensor, and (ii) provide at least one control signal for controlling extent of deceleration of the host vehicle based upon a relative velocity difference between the host vehicle and a vehicle in front of the host vehicle when the at least one sensor provides the collision signal indicative of the host vehicle colliding with the vehicle in front of the host vehicle.

In accordance with yet another embodiment, an autonomous emergency braking method is provided for a host vehicle in the event of a collision of the host vehicle with a vehicle in front of the host vehicle. The method comprises controllably decelerating the host vehicle based upon velocity of one or more moving vehicles adjacent to the host vehicle. The method also comprises determining how long the host vehicle is to be controllably decelerated.

DETAILED DESCRIPTION

The present application is directed to an autonomous emergency braking apparatus for a vehicle. The specific construction of the autonomous emergency braking apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
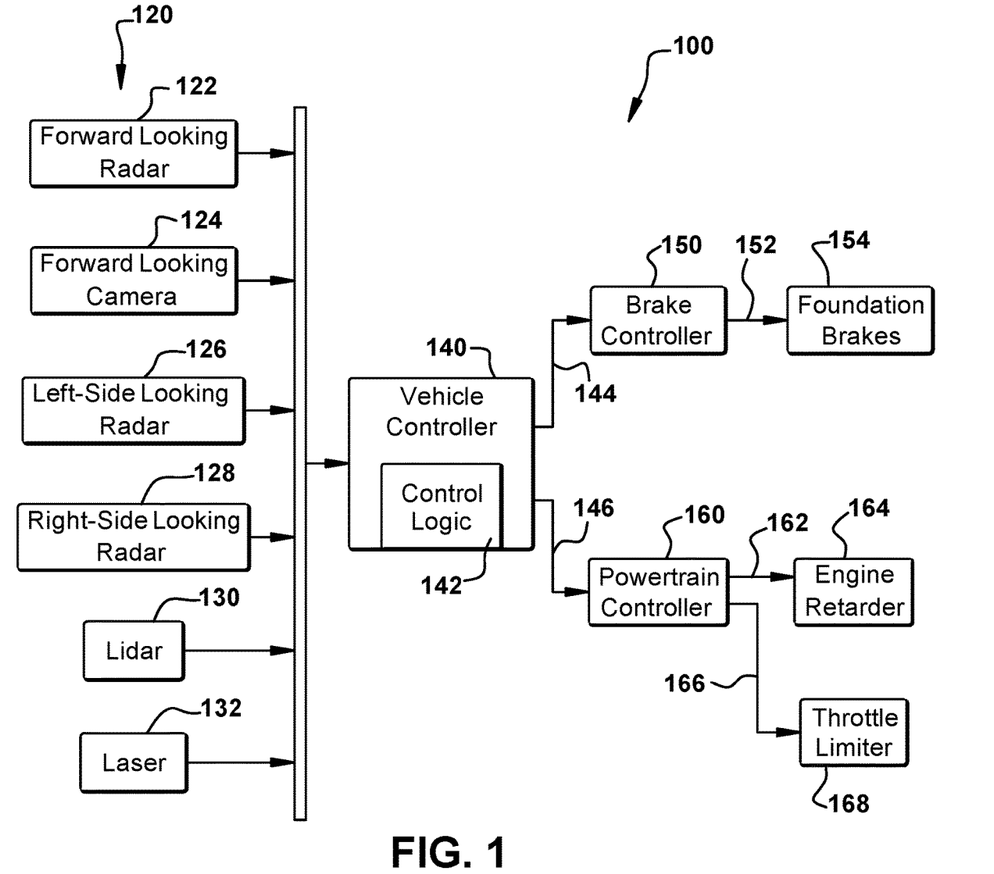
FIG. 1 is a schematic block diagram showing an example autonomous emergency braking apparatus constructed in accordance with an embodiment.

Referring to FIG. 1, a schematic block diagram showing an example autonomous emergency braking apparatus 100 constructed in accordance with an embodiment is illustrated. The autonomous emergency braking apparatus 100 can be embodied in a host vehicle (not shown) such as a truck.

Autonomous emergency braking apparatus 100 includes a number of devices 120 that provide a plurality of output signals indicative of a corresponding plurality of traffic factors surrounding the host vehicle. The devices 120 include but are not limited to traffic measurement devices, such as a forward-looking radar 122, a forward-looking camera 124, a left-side-looking radar 126, a right-side-looking radar 128, a lidar sensor 130, and a laser sensor 132. Each of the devices 120 provides a corresponding output signal indicative of a traffic factor surrounding the host vehicle.

The forward-looking radar 122 and the forward-looking camera 124 cooperate together to provide one or more output signals indicative of one or more traffic factors associated with any vehicle that may be traveling in front of and in the same lane as the host vehicle. The left-side-looking radar 126 provides one or more output signals indicative of one or more traffic factors associated with any vehicle that may be traveling in an adjacent lane on the left-side of the host vehicle. Similarly, the right-side-looking radar 128 provides one or more output signals indicative of one or more traffic factors associated with any vehicle that may be traveling in an adjacent lane on the right-side of the host vehicle.

The lidar sensor 130 can aid in the radar detection and the camera detection. As an example, the lidar sensor 130 provides one or more output signals indicative of one or more traffic factors associated with any vehicle that may be traveling in an adjacent lane near the host vehicle. The laser sensor 132 can also aid in the radar detection and the camera detection. As an example, the laser sensor 132 provides one or more output signals indicative of one or more traffic factors associated with any vehicle that may be traveling in an adjacent lane near the host vehicle. Structure and operation of devices 120 are known and conventional and, therefore, will not be described.

Autonomous emergency braking apparatus 100 also includes a vehicle controller 140 in the form of an electronic controller unit that is arranged to monitor the output signals from the devices 120 indicative of the plurality of traffic factors surrounding the host vehicle. The devices 120 may be hardwired or communicate via a controller area network (CAN) bus, or a combination of both, to the vehicle controller 140. The vehicle controller 140 provides one or more control signals based upon control logic 142 that is stored in a data storage unit of the vehicle controller 140. In some implementations, the vehicle controller 140 may comprise the controller that is used in the Bendix Fusion™ advanced driver assistance system, commercially available from Bendix Commercial Vehicle Systems, LLC located in Avon, Ohio.

As shown in FIG. 1, the vehicle controller 140 provides control signals on line 144 to a brake controller 150 which, in turn, provides a control signal on line 152 to control foundation brakes 154 of the host vehicle. The vehicle controller 140 also provides control signals on line 146 to a powertrain controller 160 which, in turn, provides control signals on line 162 to control an engine retarder 164 of the host vehicle. The powertrain controller 160 also provides control signals on line 166 to control a throttle limiter 168 of the host vehicle. Structure and operation of foundation brakes 154, engine retarder 164, and throttle limiter 168 are known and conventional and, therefore, will not be described.

In accordance with an aspect of the present disclosure, the vehicle controller 140 monitors the output signals from the devices 120 and provides one or more control signals to the brake controller 150 and the powertrain controller 160 to controllably decelerate the host vehicle in the event the host vehicle collides (or can potentially collide) with a vehicle traveling in front of and in the same lane as the host vehicle. Notably, the host vehicle is controllably decelerated based upon velocity of traffic surrounding the host vehicle at the moment of impact with the front vehicle. Traffic surrounding the host vehicle includes any vehicle that may be traveling in an adjacent lane on the left side of the host vehicle or any vehicle that may be traveling in an adjacent lane on the right side of the host vehicle.

In an example implementation, a forward sensor comprising the combination of the forward-looking radar 122 and the forward-looking camera 124 is mounted on the host vehicle and is arranged to detect a potential or actual collision of the host vehicle with a vehicle in front of the host vehicle. In response to detecting a potential or actual collision, a collision signal indicative thereof from the combination of the forward-looking radar 122 and the forward-looking camera 124 is provided to the vehicle controller 140.

A first traffic sensor comprising the left-side-looking radar 126 is mounted on the host vehicle and is arranged to detect velocity of a first moving vehicle adjacent to the left-side of the host vehicle and to provide a first velocity signal indicative thereof. A second traffic sensor comprising the right-side-looking radar 128 is mounted on the host vehicle and is arranged to detect velocity of a second moving vehicle adjacent to the right-side of the host vehicle and to provide a second velocity signal indicative thereof. The first and second velocity signals are processed to provide a traffic velocity signal.

When a potential or actual collision of the host vehicle with a vehicle in front of the host vehicle is detected (as indicated by a collision signal), the host vehicle is controllably decelerated based upon the traffic velocity signal. In some implementations, the host vehicle is controllably decelerated based upon only the first velocity signal from the left-side-looking radar 126 or only the second velocity signal from the right-side-looking radar 128. In some implementations, the first and second velocity signals are averaged to provide the traffic velocity signal. Accordingly, in the latter implementations, the host vehicle is controllably decelerated based upon the average of the first and second velocity signals.

In accordance with another aspect of the present disclosure, the vehicle controller 140 of the host vehicle is arranged to monitor one or more sensor signals indicative of status of at least one vehicle adjacent to the host vehicle. The at least one vehicle adjacent to the host vehicle may comprise a vehicle in an adjacent lane on the left side of the host vehicle or a vehicle in an adjacent lane on the right side of the host vehicle, or both. The status of the at least one vehicle may comprise presence of the vehicle or velocity of the vehicle, for example. In the event of the host vehicle colliding with a vehicle in front of and in the same lane as the host vehicle, at least one control signal is provided for controlling extent of deceleration (i.e., a prolonged or continued deceleration) of the host vehicle based upon the status of the at least one vehicle adjacent to (e.g., beside) the host vehicle.

The extent of deceleration of the host vehicle is based upon the status of any vehicle that may be traveling in the adjacent lane on the left side of the host vehicle and the status of any vehicle that may be traveling in the adjacent lane on the right side of the host vehicle at the moment of impact of the host vehicle with the vehicle in front of the host vehicle. The status of a vehicle may be associated with velocity of that particular vehicle relative to velocity of the host vehicle. The velocity of the particular vehicle and the velocity of the host vehicle may be compared to each other such that the vehicle controller 140 shown in FIG. 1 provides a control signal on line 144 to the brake controller 150 and a control signal on line 146 to the powertrain controller 160.

The brake controller 150 in turn provides a foundation brake control signal on line 152 to the foundation brakes 154. The powertrain controller 160 in turn provides an engine retarding control signal on line 162 to the engine retarder 164, and a throttle limiting control signal on line 166 to the throttle limiter 168. The foundation brakes 154, the engine retarder 164, and the throttle limiter 168 are controlled in combination by the vehicle controller 140, the brake controller 150, and the powertrain controller 160 to provide the means to control the extent of deceleration of the host vehicle. It is contemplated that the foundation brakes 154 provide the majority of the extent of deceleration of the host vehicle. Thus, in response to the host vehicle colliding or potentially colliding with a vehicle in front of and in the same lane as the host vehicle, the extent of deceleration of the host vehicle is controlled based upon velocity of any vehicle that may be traveling in an adjacent lane on the left side of the host vehicle and velocity of any vehicle that may be traveling in an adjacent lane on the right side of the host vehicle.

In accordance with yet another aspect of the present disclosure, the vehicle controller 140 provides at least one control signal for controlling extent of deceleration of the host vehicle based upon a relative velocity difference between the host vehicle and a vehicle in front of the host vehicle in the event the host vehicle collides with the vehicle in front of the host vehicle. The relative velocity difference is the velocity of the host vehicle at the moment of collision impact subtracted from the velocity of the front vehicle at the moment of collision impact. The extent of deceleration is controlled (i.e., prolonged or continued) when the relative velocity difference is less than a predetermined velocity threshold.

Figure 2:
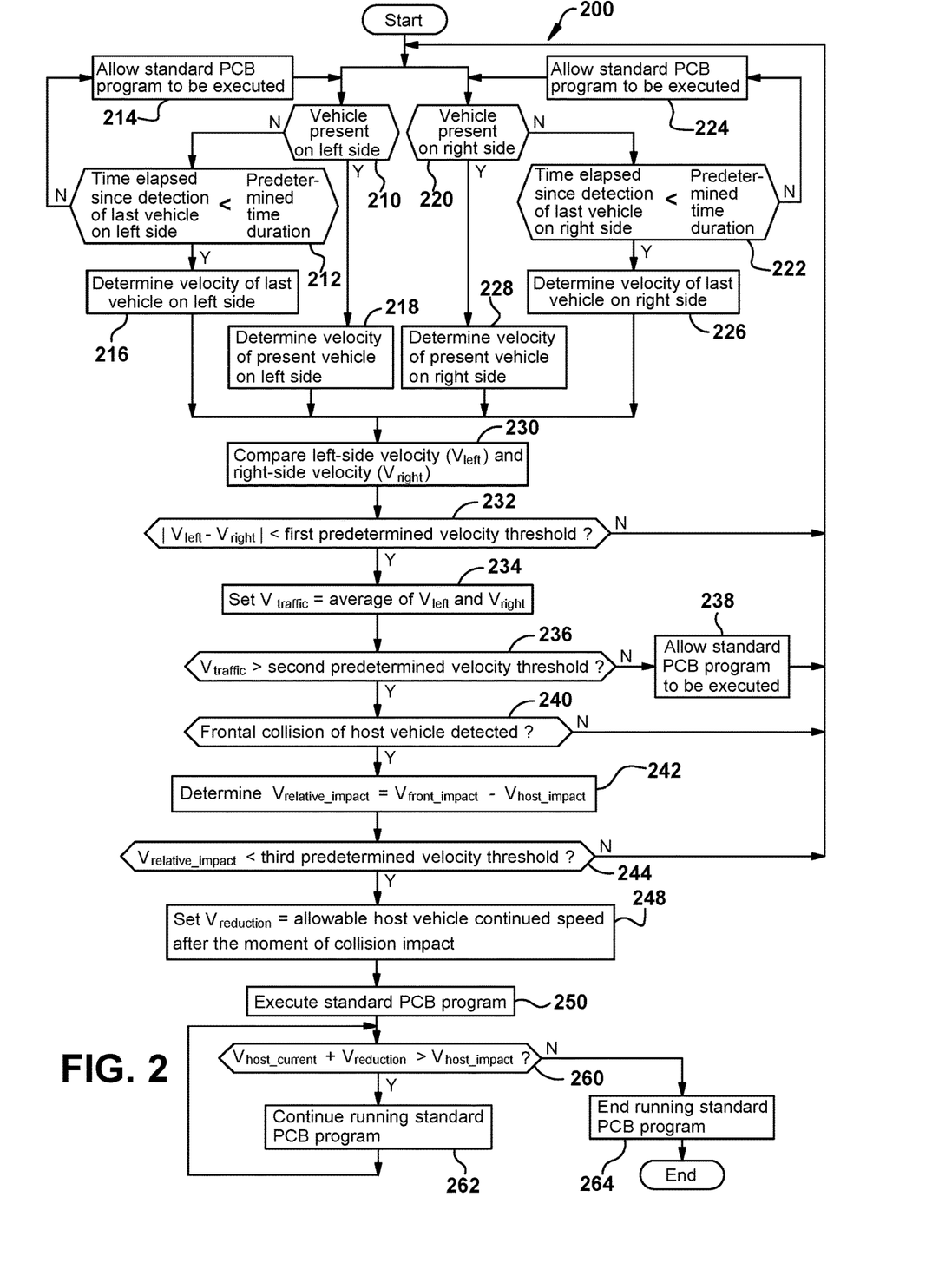
FIG. 2 is a flow diagram depicting an example method of operating the autonomous emergency braking apparatus of FIG. 1 in accordance with an embodiment.

Referring to FIG. 2, a flow diagram 200 depicts an example method of operating the autonomous emergency braking apparatus 100 of FIG. 1 in accordance with an embodiment. In block 210, a determination is made as to whether a vehicle is present in an adjacent lane on the left side of the host vehicle. If the determination in block 210 is negative (i.e., there is no vehicle on the left side of the host vehicle), the process proceeds to block 212 in which a determination is made as to whether the time elapsed since the last vehicle was detected on the left side of the host vehicle is less than a predetermined time duration.

If the determination in block 212 is negative (i.e., the time elapsed is greater than the predetermined time duration), the process proceeds to block 214 to indicate that a standard post-collision-braking (PCB) program, which resides outside of the present process of FIG. 2, can be executed in the event of a collision or potential collision of the host vehicle with a vehicle in front of the host vehicle. The process then returns back to block 210 to continue monitoring the left side of the host vehicle for presence of a vehicle that may be traveling in the adjacent lane. However, if the determination in block 212 is affirmative (i.e., the time elapsed is less than the predetermined time duration), the process proceeds to block 216 in which the velocity of the last vehicle that was previously detected on the left side of the host vehicle is either retrieved from memory or determined if required.

However, if the determination back in block 210 is affirmative (i.e., there is currently a vehicle present in an adjacent lane on the left side of the host vehicle), the process proceeds to block 218. In block 218, the velocity of the vehicle that is present in the adjacent lane on the left side of the vehicle is determined.

Similarly, in block 220, a determination is made as to whether a vehicle is present in an adjacent lane on the right side of the host vehicle. If the determination in block 220 is negative (i.e., there is no vehicle on the right side of the host vehicle), the process proceeds to block 222 in which a determination is made as to whether the time elapsed since the last vehicle was detected on the right side of the host vehicle is less than a predetermined time duration.

If the determination in block 222 is negative (i.e., the time elapsed is greater than the predetermined time duration), the process proceeds to block 224 to indicate that the standard PCB program, which resides outside of the present process of FIG. 2, can be executed in the event of a collision or potential collision of the host vehicle with a vehicle in front of the host vehicle. The process then returns back to block 220 to continue monitoring the right side of the host vehicle for presence of a vehicle that may be traveling in the adjacent lane. However, if the determination in block 222 is affirmative (i.e., the time elapsed is less than the predetermined time duration), the process proceeds to block 226 in which the velocity of the last vehicle that was previously detected on the right side of the host vehicle is either retrieved from memory or determined if required.

However, if the determination back in block 220 is affirmative (i.e., there is currently a vehicle present in an adjacent lane on the right side of the host vehicle), the process proceeds to block 228. In block 228, the velocity of the vehicle that is present in the adjacent lane on the right side of the vehicle is determined.

After determinations are made as to whether there is a vehicle on the left side of the host vehicle or a vehicle on the right side of the host vehicle, the process proceeds to block 230 in which the velocity of a vehicle (either a present one or the last one) on the left side of the host vehicle and the velocity of a vehicle (either a present one or the last one) on the right side of the host vehicle are compared. The velocity of the vehicle on the left side is designated "$V_{left}$", and the velocity of the vehicle on the right side is designated "$V_{right}$". Then in block 232, a determination is made as to whether the absolute value of the difference between $V_{left}$ and $V_{right}$ is less than a first predetermined velocity threshold. The first predetermined velocity threshold may be in a range between about 15 miles per hour (mph) and 20 mph, for example.

If the determination in block 232 is negative (i.e., the absolute difference is greater than the first predetermined velocity threshold), the process returns back to the start to continue monitoring the left and right sides of the host vehicle for the presence vehicles in adjacent lanes. However, if the determination in block 232 is affirmative (i.e., the absolute difference is less than the first predetermined velocity threshold), the process proceeds to block 234. In block 234, an average of $V_{left}$ and $V_{right}$ is calculated and is designated "$V_{traffic}$". The process proceeds to block 236.

In block 236, a determination is made as to whether $V_{traffic}$ is greater than a second predetermined velocity threshold. The second predetermined velocity threshold may be about 40 mph, for example. If the determination in block 236 is negative (i.e., $V_{traffic}$ is less than the second predetermined velocity threshold), the process proceeds to block 238 to indicate that the standard PCB program, which resides outside of the present process of FIG. 2, can be executed in the event of a collision or potential collision of the host vehicle with a vehicle in front of the host vehicle. As such, the standard PCB program is active whenever $V_{traffic}$ is less than the second predetermined velocity threshold (e.g., 40 mph). The process then returns back to the start to continue monitoring the left and right sides of the host vehicle for the presence vehicles in the adjacent lanes.

However, if the determination in block 236 is affirmative (i.e., $V_{traffic}$ is greater than the second predetermined velocity threshold), the process proceeds to block 240. In block 240, a determination is made as to whether a frontal collision of the host vehicle is detected. If the determination is negative (i.e., no frontal collision is detected), the process returns back to the start to continue monitoring the left and right sides of the host vehicle for the presence vehicles in adjacent lanes. However, if the determination is affirmative (i.e., a frontal collision is detected), the process proceeds to block 242.

In block 242, an after-collision relative velocity (designated "$V_{relative\_impact}$") is determined by subtracting the velocity of the host vehicle at the moment of collision impact (designated "$V_{host\_impact}$") from the velocity of the vehicle in front of the host vehicle at the moment of collision impact (designated "$V_{front\_impact}$"). This determination is expressed as $V_{relative\_impact} = V_{front\_impact} - V_{host\_impact}$. The process then proceeds to block 244.

In block 244, a determination is made as to whether $V_{relative\_impact}$ is less than a third predetermined velocity threshold. The third predetermined velocity threshold may be between about 10 mph and 30 mph, for example. If the determination in block 242 is negative (i.e., $V_{relative\_impact}$ is greater than the third predetermined velocity threshold and therefore indicative of a more severe collision), the process returns back to the start to continue monitoring the left and right sides of the host vehicle for the presence of vehicles in adjacent lanes. However, if the determination in block 244 is affirmative (i.e., $V_{relative\_impact}$ is less than the third predetermined velocity threshold and therefore indicative of a less severe collision such as a fender bender), the process proceeds to block 248.

In block 248, a variable designated "$V_{reduction}$" is set equal to an allowable host vehicle continued speed reduction after the moment of collision impact, which will be described in more detail later. $V_{reduction}$ is a configurable offset velocity value, and may be about 25 mph, for example. Other values of $V_{reduction}$ are possible. The process then proceeds to block 250. In block 250, the standard PCB program, which resides outside of the present process of FIG. 2, is executed in response to the collision of the host vehicle with the front vehicle. The process proceeds to block 260.

In block 260, a determination is made as to whether the quantity of the current velocity of the host vehicle (designated "$V_{host\_current}$") plus $V_{reduction}$ is greater than the velocity of the host vehicle at the moment of collision impact (i.e., whether $(V_{host\_current}+V_{reduction})>V_{host\_impact}$). If the determination in block 260 is affirmative (i.e., $(V_{host\_current}+V_{reduction})$ is greater than $V_{host\_impact}$), the process proceeds to block 262 to continue running the standard PCB program, and then loops back to block 260 to continue comparing the quantity $(V_{host\_current}+V_{reduction})$ and $V_{host\_impact}$. However, if the determination in block 260 is negative (i.e., $(V_{host\_current}+V_{reduction})$ is less than $V_{host\_impact}$), the process proceeds to block 264 to discontinue running the standard PCB program. The process then ends.

It should be apparent that a determination is being made in block 260 of FIG. 2 as to how long (i.e., how prolonged or continued) the host vehicle is to be controllably decelerated in response to the frontal collision that has been detected in block 240. The determination made in block 260 varies as a function of a difference (i.e., a comparison) between the quantity $(V_{host\_current}+V_{reduction})$ and $V_{host\_impact}$.

The offset velocity value $V_{reduction}$ is unlimited and allows a difference in velocity between $V_{host\_current}$ and $V_{host\_impact}$ to be deemed an acceptable difference such that the standard PCB program can continue to decelerate the host vehicle (as depicted in blocks 260 and 262 of FIG. 2). For example, if $V_{reduction}$ were set to a value of 10 mph, the standard PCB program would continue to run and, therefore, the host vehicle would continue to decelerate only if the quantity $(V_{host\_current}+10\text{ mph})$ continues being at least slightly more than $V_{host\_impact}$.

However, if $V_{reduction}$ were set to a value of 20 mph, the standard PCB program would continue to run and, therefore, the host vehicle would continue to decelerate only if the quantity $(V_{host\_current}+20\text{ mph})$ continues being at least slightly more than $V_{host\_impact}$. Similarly, if $V_{reduction}$ were set to a value of 30 mph, the standard PCB program would continue to run and, therefore, the host vehicle would continue to decelerate only if the quantity $(V_{host\_current}+30\text{ mph})$ continues being at least slightly more than $V_{host\_impact}$. Accordingly, the amount of time that the host vehicle is being controllably decelerated (i.e., how prolonged or continued the standard PCB program is being run) after collision impact depends upon and varies as a function of the offset velocity value $V_{reduction}$.

The offset velocity value $V_{reduction}$ provides a number of features. One feature is that the standard PCB program is provided with a novel exit condition in which the standard PCB program would continue to run and the host vehicle would continue to decelerate only if the quantity $(V_{host\_current}+V_{reduction})>V_{host\_impact}$. As an example, if the collision occurred with a host vehicle impact velocity of 60 mph (i.e., $V_{host\_impact}=60$ mph) and an offset velocity value of 20 mph (i.e., $V_{reduction}=20$ mph), then the standard PCB program would exit and deceleration of the host vehicle would be canceled once the current velocity of the host vehicle (i.e., $V_{host\_current}$) drops below 40 mph.

Another feature is that $V_{reduction}$ provides a tool for configuring how prolonged or continued a particular host vehicle should be decelerated in the event of a collision or potential collision. The type of the particular front vehicle that the host vehicle collides with may determine how prolonged or continued the host vehicle should be decelerated. For example, $V_{reduction}$ may have a value of 30 mph if the front vehicle is a truck, a value of 20 mph if the front vehicle is a car, and a value of 10 mph if the front vehicle is a motorcycle. Thus, for a given velocity of the host vehicle at the moment of collision impact (i.e., $V_{host\_impact}$) with a front vehicle that is a truck, the current velocity of the host vehicle (i.e., $V_{host\_current}$) would need to reach a lower velocity as compared to a car or a motorcycle, before exiting the standard PCB program and thereby discontinuing deceleration of the host vehicle.

It should also be apparent that blocks 202 through block 234 shown in the flow diagram of FIG. 2 depict a determination of velocity of neighboring traffic in lanes that are adjacent to the host vehicle. Thus, the determination of how long a host vehicle should be controllably decelerated varies not only as a function of the offset velocity value $V_{reduction}$ but also as a function of the velocity of neighboring traffic in lanes that are adjacent to the host vehicle.

Figure 3:
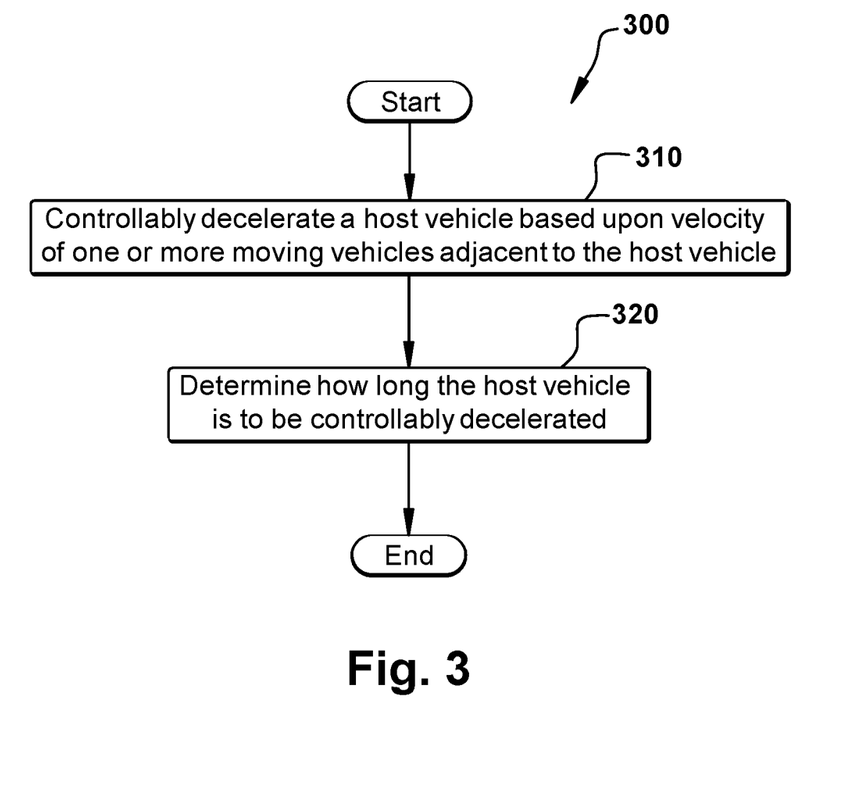
FIG. 3 is a flow diagram depicting an example method of operating the autonomous emergency braking apparatus of FIG. 1 in accordance with another embodiment.

Referring to FIG. 3, a flow diagram 300 depicts an example method of operating the autonomous emergency braking apparatus 100 of FIG. 1 in accordance with another embodiment. The autonomous emergency braking method is provided for a host vehicle in the event of a collision of the host vehicle with a vehicle in front of the host vehicle. In block 310, the host vehicle is controllably decelerated based upon velocity of one or more moving vehicles adjacent to the host vehicle. Then in block 320, a determination is made as to how long the host vehicle is to be controllably decelerated. The process then ends.

In some embodiments, the determination as to how long the host vehicle is to be controllably decelerated includes prolonging how long the host vehicle is to be controllably decelerated based upon at least a difference between velocity of the vehicle in front of the host vehicle and velocity of the host vehicle at the moment of collision impact of the host vehicle with the vehicle in front of the host vehicle.

In some embodiments, decelerating of the host vehicle is continued when current velocity of the host vehicle after collision impact plus a configurable offset velocity value is greater than velocity of the host vehicle at the moment of collision impact, and decelerating the host vehicle is discontinued when current velocity of the host vehicle after collision impact plus the configurable offset velocity value is less than velocity of the host vehicle at the moment of collision impact.

In some embodiments, a velocity of a moving vehicle adjacent to left-side of the host vehicle and a velocity of a moving vehicle adjacent to right-side of the host vehicle are averaged to provide a traffic velocity that is an average of the velocities. In some embodiments, the host vehicle is controllably decelerated based upon the traffic velocity. In some embodiments, the host vehicle is controllably decelerated based upon the traffic velocity when the traffic velocity is greater than a predetermined velocity threshold.

In some embodiments, the method is performed by a computer having a memory executing one or more programs of instructions which are tangibly embodied in a program storage medium readable by the computer.

Program instructions for enabling the vehicle controller 140 shown in FIG. 1 to perform operation steps in accordance with flow diagram 200 shown in FIG. 2 or flow diagram 300 shown in FIG. 3 may be embedded in memory internal to vehicle controller 140. Alternatively, or in addition to, program instructions may be stored in memory external to vehicle controller 140. As an example, program instructions may be stored in memory internal to a different electronic controller of the vehicle. Program instructions may be stored on any type of program storage media including, but not limited to, external hard drives, flash drives, and compact discs. Program instructions may be reprogrammed depending upon features of the particular electronic controller.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of three electronic controllers 140, 150, 160, it is conceivable that any number of electronic controllers may be used. For example, the three controllers 140, 150, 160 may comprise a single-integrated controller or two separate controllers instead of three separate controllers. Moreover, it is conceivable that any type of electronic controller may be used. Suitable electronic controllers for use in vehicles are known and, therefore, have not been described. Accordingly, the program instructions of the present disclosure can be stored on program storage media associated with one or more electronic controllers.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An autonomous emergency braking apparatus for a host vehicle having one or more sensors providing one or more sensor signals indicative of a velocity of at least one vehicle adjacent to the host vehicle, the autonomous emergency braking apparatus comprising:
   a vehicle controller arranged to (i) monitor the one or more sensor signals indicative of the velocity of a vehicle adjacent to the right-side of the host vehicle and a velocity of a vehicle adjacent to the left-side of the host vehicle, and (ii) provide at least one control signal for controlling extent of deceleration of the host vehicle based upon an average of the velocity of the vehicle adjacent to the right-side of the host vehicle and the vehicle adjacent to the left-side of the host vehicle in the event of the host vehicle colliding with a vehicle in front of the host vehicle.

2. An autonomous emergency braking apparatus according to claim 1, wherein the at least one control signal comprises a combination of a foundation brake control signal, an engine retarding control signal, and a throttle limiting control signal.

3. An autonomous emergency braking apparatus according to claim 1 further comprising:
   a brake controller arranged to provide a foundation brake control signal to foundation brakes of the host vehicle; and
   a powertrain controller arranged to provide (i) an engine retarding control signal to an engine retarder of the host vehicle, and (ii) a throttle limiting control signal to a throttle limiter of the host vehicle;
   wherein the vehicle controller provides (i) a control signal to the brake controller so that the brake controller can control the foundation brakes, and (ii) a control signal to the powertrain controller so that the powertrain controller can control the engine retarder and the throttle limiter and thereby to control extent of deceleration of the host vehicle.

4. An autonomous emergency braking apparatus according to claim 3, wherein the brake controller, the powertrain controller, and the vehicle controller are each a separate controller.

5. An autonomous emergency braking apparatus according to claim 1, wherein the vehicle controller comprises a controller of an advanced driver assistance system.

6. An autonomous emergency braking apparatus for a host vehicle, the autonomous emergency braking apparatus comprising:
   at least one sensor mounted on the host vehicle and arranged to detect a potential or actual collision of the host vehicle with a vehicle in front of the host vehicle and to provide a collision signal indicative thereof;
   a first traffic sensor mounted on the host vehicle and arranged to detect velocity of a first moving vehicle adjacent to the host vehicle and to provide a first velocity signal indicative thereof;
   a second traffic sensor mounted on the host vehicle and arranged to detect velocity of a second moving vehicle adjacent to the host vehicle and to provide a second velocity signal indicative thereof; and
   control means for, when the collision signal is provided, controllably decelerating the host vehicle by prolonging how long the host vehicle is to be controllably decelerated based upon averaging the first velocity signal and the second velocity signal at the moment of actual collision of the host vehicle with the vehicle in front of the host vehicle.

7. An autonomous emergency braking apparatus according to claim 6, wherein the control means is arranged to controllably decelerate the host vehicle using foundation brakes of the host vehicle.

8. An autonomous emergency braking apparatus according to claim 6, wherein the control means is arranged to controllably decelerate the host vehicle using an engine retarder of the host vehicle.

9. An autonomous emergency braking apparatus according to claim 6, wherein the control means is arranged to controllably decelerate the host vehicle using a throttle limiter of the host vehicle.

10. An autonomous emergency braking apparatus according to claim 6, wherein the control means comprises a combination of a brake controller, a powertrain controller, and a vehicle controller.

11. An autonomous emergency braking apparatus for a host vehicle, the autonomous emergency braking apparatus comprising:
   at least one sensor mounted on the host vehicle and arranged to detect a potential or actual collision of the host vehicle with a vehicle in front of the host vehicle and to provide a collision signal indicative thereof; and
   a vehicle controller arranged to (i) monitor the at least one sensor, and (ii) provide at least one control signal for controlling extent of deceleration of the host vehicle by prolonging deceleration of the host vehicle based upon a relative velocity difference between the host vehicle and a vehicle in front of the host vehicle at the moment the at least one sensor provides the collision signal indicative of the host vehicle colliding with the vehicle in front of the host vehicle.

12. An autonomous emergency braking apparatus according to claim 11, wherein the relative velocity difference is velocity of the host vehicle at moment of collision impact subtracted from velocity of the front vehicle at moment of collision impact.

13. An autonomous emergency braking apparatus according to claim 12, wherein the at least one control signal is provided to control extent of deceleration when the relative velocity difference is less than a predetermined velocity threshold.

14. An autonomous emergency braking apparatus according to claim 13, wherein the predetermined velocity threshold is between about 10 miles per hour and 30 miles per hour.

15. An autonomous emergency braking method for a host vehicle in the event of a collision of the host vehicle with a vehicle in front of the host vehicle, the method comprising:
   controllably decelerating the host vehicle based upon velocity of one or more moving vehicles adjacent to the host vehicle;
   determining how long the host vehicle is to be controllably decelerated by prolonging how long the host vehicle is to be controllably decelerated based upon at least a difference between velocity of the vehicle in front of the host vehicle and velocity of the host vehicle at the moment of collision impact of the host vehicle with the vehicle in front of the host vehicle.

16. An autonomous emergency braking method according to claim 15 further comprising:
   continue decelerating the host vehicle when current velocity of the host vehicle after collision impact plus a configurable offset velocity value is greater than velocity of the host vehicle at the moment of collision impact; and
   discontinue decelerating the host vehicle when current velocity of the host vehicle after collision impact plus the configurable offset velocity value is less than velocity of the host vehicle at the moment of collision impact.

17. An autonomous emergency braking method according to claim 15, wherein the method is performed by a computer having a memory executing one or more programs of instructions which are tangibly embodied in a program storage medium readable by the computer.

18. An autonomous emergency braking method comprising:
   controllably decelerating the host vehicle based upon velocity of one or more moving vehicles adjacent to the host vehicle;
   determining how long the host vehicle is to be controllably decelerated;
   averaging a velocity of a moving vehicle adjacent to left-side of the host vehicle and a velocity of a moving vehicle adjacent to right-side of the host vehicle to provide a traffic velocity that is an average of the velocities; and
   controllably decelerating the host vehicle based upon the traffic velocity.

19. An autonomous emergency braking method according to claim 18, wherein controllably decelerating the host vehicle based upon the traffic velocity includes:
   controllably decelerating the host vehicle based upon the traffic velocity when the traffic velocity is greater than a predetermined velocity threshold.

* * * * *